US007964988B2

(12) United States Patent
Kitagawa et al.

(10) Patent No.: US 7,964,988 B2
(45) Date of Patent: Jun. 21, 2011

(54) LIGHTING CONTROLLER OF LIGHTING DEVICE FOR VEHICLE

(75) Inventors: Takayoshi Kitagawa, Shizuoka (JP); Masayasu Ito, Shizuoka (JP); Yasushi Noyori, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 373 days.

(21) Appl. No.: 12/335,085

(22) Filed: Dec. 15, 2008

(65) Prior Publication Data

US 2009/0153059 A1 Jun. 18, 2009

(30) Foreign Application Priority Data

Dec. 17, 2007 (JP) ................................ 2007-324788

(51) Int. Cl.
*B60L 1/14* (2006.01)

(52) U.S. Cl. ........ 307/10.8; 315/219; 315/224; 315/308

(58) Field of Classification Search ................. 307/10.1, 307/10.8; 315/77, 82, 209 R, 210, 219, 224, 315/225, 291, 307, 308

See application file for complete search history.

(56) References Cited

U.S. PATENT DOCUMENTS

| | | | |
|---|---|---|---|
| 6,225,912 B1 | 5/2001 | Tanaka et al. | |
| 6,844,681 B2 * | 1/2005 | Serizawa et al. | 315/77 |
| 7,327,051 B2 * | 2/2008 | Ito et al. | 307/10.8 |
| 7,482,765 B2 * | 1/2009 | Ito et al. | 315/312 |
| 7,750,579 B2 * | 7/2010 | Aiello | 315/247 |
| 2005/0179393 A1 | 8/2005 | Murakami et al. | |
| 2006/0082332 A1 | 4/2006 | Ito et al. | |
| 2007/0013321 A1 | 1/2007 | Ito et al. | |

FOREIGN PATENT DOCUMENTS

| | | | |
|---|---|---|---|
| DE | 10 2004 045 435 | A1 | 3/2006 |
| JP | 2006-103477 | A | 4/2006 |

OTHER PUBLICATIONS

European Search Report issued in European Application No. EP 08 02 1810 dated Mar. 20, 2009, 8 pages.
Communication pursuant to Article 94(3) EPC issued in European Application No. 08 021 810.0-2206 dated Oct. 27, 2009, 5 pages.

* cited by examiner

*Primary Examiner* — Thuy Vinh Tran
(74) *Attorney, Agent, or Firm* — Osha • Liang LLP

(57) ABSTRACT

A lighting controller of a lighting device for a vehicle includes a switching regulator for supplying a driving current to first to Nth (N is an integer of one or more) semiconductor light sources; first to Nth current driving portions; and a control portion. The first to Nth current driving portions include first to Nth current detecting portions connected in series to the semiconductor light sources and serving to detect the driving current respectively, first to Nth switching portions connected to positive electrode sides of the semiconductor light sources respectively, and first to Nth comparing portions for transmitting a comparing output corresponding to a result of a comparison, which is obtained by comparing values of the driving currents detected by the current detecting portions with a predetermined threshold respectively. The first to Nth current driving portions serve to carry out operations of the switching portions corresponding to the comparing output respectively. The control portion includes first to Nth first voltage drop detecting portions for detecting voltages on output sides of the comparing portions and transmitting first to Nth first detection results, and first to Nth second voltage drop detecting portions for detecting voltages on positive electrode sides of the semiconductor light sources and transmitting first to Nth second detection results respectively. The control portion controls the first to Nth current driving portions corresponding to the first to Nth first detection results and the first to Nth second detection results respectively.

8 Claims, 2 Drawing Sheets

LIGHTING CONTROLLER OF LIGHTING DEVICE FOR VEHICLE

BACKGROUND OF INVENTION

1. Field of the Invention

The present invention relates to a lighting controller of a lighting device for a vehicle and, more particularly, to a lighting controller of a lighting device for a vehicle that serves to control a lighting operation of a semiconductor light source constituted by a semiconductor light emitting device.

2. Related Art

Conventionally, there has been known a lighting device for a vehicle that uses, as a semiconductor light source, a semiconductor light emitting device, for example, a light emitting diode (LED). A lighting controller for controlling a lighting operation of the LED is mounted on the lighting device for a vehicle of this type.

The lighting controller is constituted by connecting a single switching regulator to a plurality of series regulators (for example, see Patent Document 1).

The single switching regulator includes a transformer, a capacitor, a diode, and an NMOS (Negative Channel Metal Oxide Semiconductor) transistor. The single switching regulator functions as current supplying means for supplying a driving current to a plurality of LEDs.

A plurality of series regulators includes an NMOS transistor, a shunt resistor, and a comparison amplifier respectively, and carries out the ON/OFF operations and dimming of the LED through a constant current control.

The shunt resistor detects a driving current (an LED driving current) supplied from the single switching regulator to the LED as a voltage generated on both ends of the shunt resistor (which will be hereinafter referred to as a "detected voltage"). The detected voltage is applied to an inverted input terminal (a negative input terminal) of the comparison amplifier.

The comparison amplifier compares the detected voltage applied to the negative input terminal with a reference voltage applied to a non-inverted input terminal (a positive input terminal) and applies a voltage (a comparing output) corresponding to a result of the comparison to a gate of the NMOS transistor to control ON/OFF operations of the NMOS transistor.

The comparing output applied to the NMOS transistor is fed back to a control circuit. The control circuit decides whether the operation of the single switching regulator is stopped or not upon receipt of the comparing output, which is fed back, and controls the NMOS transistor constituting the switching regulator in order to stop the operation of the single switching regulator when the comparing output exceeds a predetermined threshold.

When an output of the LED is opened (a first abnormal state), a lower voltage than the reference voltage of the positive input terminal is applied to the negative input terminal of the comparison amplifier. Therefore, the comparing output is sent from the comparison amplifier having a greater value than before. As a result, the first abnormal state is detected by the control circuit monitoring a connecting node voltage between the comparison amplifier and the NMOS transistor.

When an anode and a cathode in the LED are short-circuited (a second abnormal state), a voltage on the anode side is dropped so that a voltage on the output side of the switching regulator is dropped. The second abnormal state is detected by the control circuit monitoring the voltage on the output side of the switching regulator.

When the anode side of the LED is grounded (a third abnormal state), the voltage on the anode side is reduced so that the voltage on the output side of the switching regulator is dropped in the same manner as the second abnormal state. The third abnormal state is detected by the control circuit monitoring the voltage on the output side of the switching regulator.

When the cathode side of the LED is grounded (a fourth abnormal state), a consistency of the number of the LEDs and a current supplied to each of the LEDs is monitored by a current detector provided on the output side of the switching regulator and it is decided that the fourth abnormal state is brought in case of an inconsistency. For example, if the cathode is grounded in only one of the LEDs, a current value of the LED driving current supplied to all of the LEDs is greater than that of the LED driving current supplied to all of the LEDs in a normal state. When it is detected that a total value of the LED driving currents is greater than a total value of the LED driving currents in the normal case, the control circuit recognizes that any of the LEDs is brought into the fourth abnormal state.

[Patent Document 1] JP-A-2006-103477 Publication

SUMMARY OF INVENTION

In the prior art, in the case in which abnormal states, for example, the opening of the LED, a short circuit between the anode and the cathode in the LED, the grounding of the anode of the LED and the grounding of the cathode of the LED, are generated on the output of the LED, it is possible to detect that the abnormal states are brought.

However, it is impossible to specify any of the four abnormal states.

Also, in the case in which the abnormal states are generated in only one of the LEDs, moreover, the control circuit carries out a control for stopping the driving operations of all of the LEDs for the switching regulator. For this reason, the LED set in a normal state is also turned OFF. For example, in the case in which four LEDs are used for a low beam lamp, a high beam lamp, a clearance lamp, and a front turn signal lamp respectively, all of the other low beam lamps, high beam lamps, and front turn signal lamps stop the driving operations even if the output abnormality is generated in only the clearance lamp. For example, therefore, a driving operation of the low beam, which is the most necessary at night is stopped simultaneously with the detection of the abnormality of only the clearance lamp. Thus, safety cannot be enhanced.

Therefore, one or more embodiments of the invention enhance safety by stopping a driving operation of only an LED brought into an abnormal state.

A first aspect of one or more embodiments of the invention is directed to a lighting controller of a lighting device for a vehicle including a switching regulator for supplying a driving current to first to Nth (N is an integer of one or more) semiconductor light sources, first to Nth current driving means having first to Nth current detecting portions connected in series to the semiconductor light sources and serving to detect the driving current respectively, first to Nth switching portions connected to positive electrode sides of the semiconductor light sources respectively, and first to Nth comparing portions for transmitting a comparing output corresponding to a result of a comparison, which is obtained by comparing values of the driving currents detected by the current detecting portions with a predetermined threshold respectively, wherein the first to Nth current driving means serves to carry out operations of the switching portions corresponding to the comparing output respectively, and control means having first to Nth first voltage drop detecting portions for detecting voltages on output sides of the comparing portions and transmitting first to Nth first detection results, and first to Nth second voltage drop detecting portions for detecting voltages on positive electrode sides of the semiconductor light sources and transmitting first to Nth second detection results respectively, wherein the control means controls the first to Nth current driving means corresponding to the first to Nth first detection results and the first to Nth second detection results respectively.

Accordingly, the first to Nth current detecting portions for detecting the driving current are connected in series to the semiconductor light sources. Therefore, it is possible to detect an abnormal output (an abnormal state) of the semiconductor light source, which is generated in the grounding of the anode of the semiconductor light source. An output on the positive electrode side of the semiconductor light source and an output of the comparing portion connected to the current detecting portion are input to the first voltage drop detecting portion and the second voltage drop detecting portion, respectively. Therefore, it is possible to specify a specific condition of an abnormality of the semiconductor light source brought into the abnormal state and to specify any of the LEDs in which the abnormal state is brought. The control means controls the output of the comparing portion upon receipt of the outputs of the first voltage drop detecting portion and the second voltage drop detecting portion. Consequently, it is possible to stop the driving operation of only the LED brought into the abnormal state.

A lighting controller of a lighting device for a vehicle according to one or more embodiments of the invention includes a switching regulator for supplying a driving current to first to Nth (N is an integer of one or more) semiconductor light sources, first to Nth current driving means having first to Nth current detecting portions connected in series to the semiconductor light sources and serving to detect the driving current respectively, first to Nth switching portions connected to positive electrode sides of the semiconductor light sources respectively, and first to Nth comparing portions for transmitting a comparing output corresponding to a result of a comparison, which is obtained by comparing values of the driving currents detected by the current detecting portions with a predetermined threshold respectively, the first to Nth current driving means serving to carry out operations of the switching portions corresponding to the comparing output respectively, and control means having first to Nth first voltage drop detecting portions for detecting voltages on output sides of the comparing portions and transmitting first to Nth first detection results, and first to Nth second voltage drop detecting portions for detecting voltages on positive electrode sides of the semiconductor light sources and transmitting first to Nth second detection results respectively, wherein the control means controls the first to Nth current driving means corresponding to the first to Nth first detection results and the first to Nth second detection results respectively.

In the case in which the abnormal state is generated in the outputs of the semiconductor light sources, accordingly, it is possible to specify a specific condition of the abnormality of the semiconductor light source and to specify any of the semiconductor light sources that is brought into the abnormal state. After specifying the semiconductor light source brought into the abnormal state, it is possible to control the driving operation of the semiconductor light source thus specified, thereby enhancing safety.

In a second aspect of one or more embodiments of the invention, the first to Nth current detecting portions are connected in series to negative electrode sides of the first to Nth semiconductor light sources respectively. Therefore, it is possible to decide whether the manner of the output abnormalities of the semiconductor light sources is an abnormality caused by opening the semiconductor light source or an abnormality caused by a short circuit between the anode and the cathode in the semiconductor light source. Furthermore, it is possible to specify any of the semiconductor light sources that is brought into the abnormal state.

In a third aspect of one or more embodiments of the invention, the driving currents detected by the first to Nth current detecting portions are input to inverted inputs of the first to Nth comparing portions respectively, and the control means controls the comparing output of the comparing portion in such a manner that a corresponding one of the switching portions is turned OFF upon receipt of the first detection result and the second detection result when an output abnormality is caused in the semiconductor light sources. After specifying the semiconductor light source in which the abnormal state is brought, therefore, it is possible to stop the driving operation of the semiconductor light source thus specified.

In a fourth aspect of one or more embodiments of the invention, the first to Nth current detecting portions are connected in series to the positive electrode sides of the first to Nth semiconductor light sources respectively. Therefore, it is possible to decide whether the manner of the output abnormalities of the semiconductor light sources is an abnormality caused by opening the semiconductor light source, an abnormality caused by a short circuit between the anode and the cathode in the semiconductor light source, an abnormality caused by the grounding of the anode or an abnormality caused by the grounding of the cathode. Furthermore, it is possible to specify any of the semiconductor light sources that is brought into the abnormal state.

Other aspects and advantages of the invention will be apparent from the following description, the drawings and the claims.

DETAILED DESCRIPTION

Figure 1:
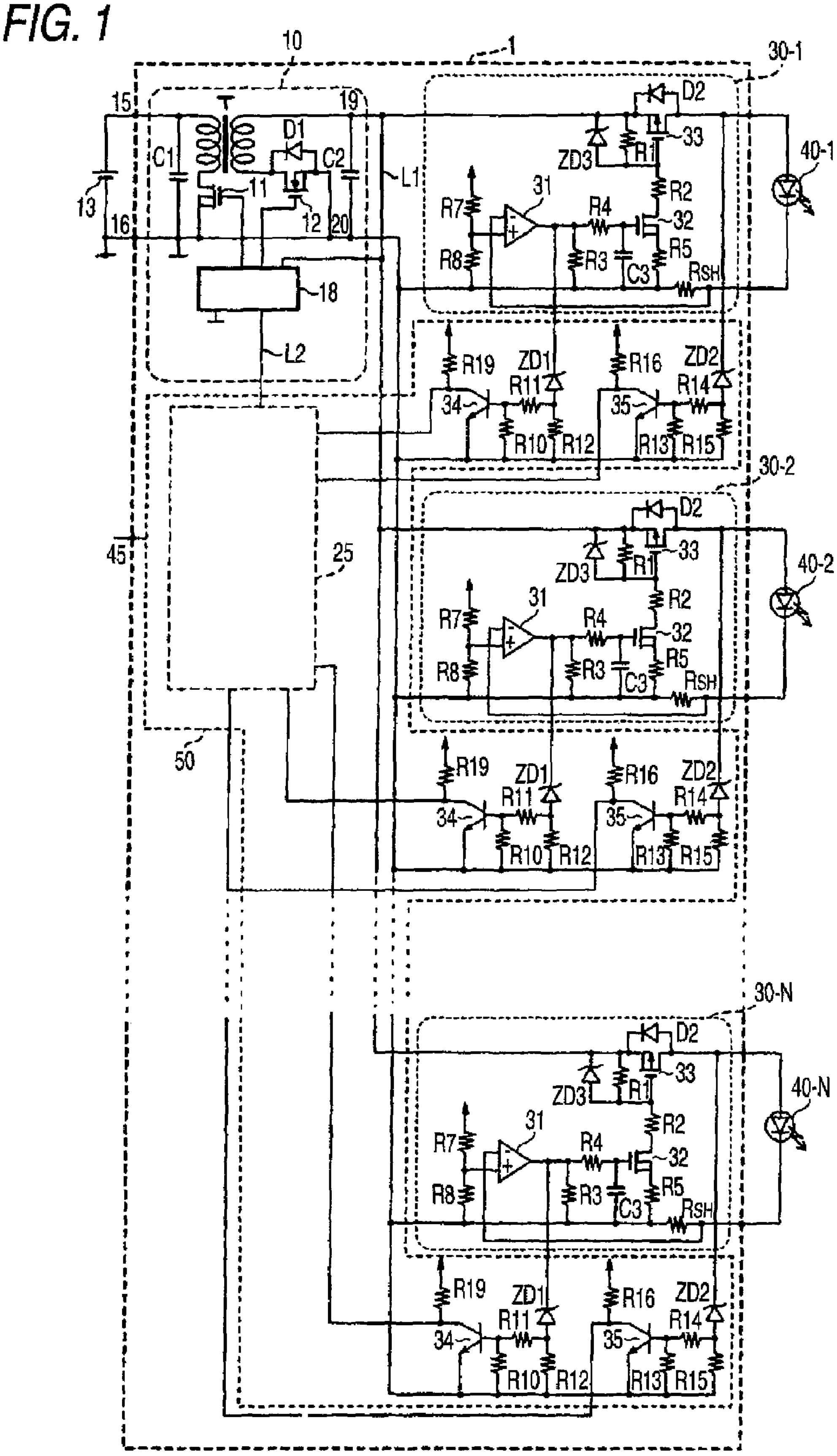
FIG. 1 is a diagram showing a structure of a lighting controller of a lighting device for a vehicle according to a first embodiment of the invention.

Description will be given to a lighting controller of a lighting device for a vehicle according to a first embodiment of the invention. FIG. 1 is a diagram showing a structure of the lighting controller of a lighting device for a vehicle according to the first embodiment of the invention.

A lighting controller 1 of a lighting device for a vehicle includes a single switching regulator 10, LEDs 40-1 to 40-N serving as semiconductor light sources, current driving portions 30-1 to 30-N, and a control portion 50 serving as control means.

The switching regulator 10 serves as a switching regulator of a flyback type and supplies an LED driving current to the LEDs 40-1 to 40-N.

The switching regulator 10 includes capacitors C1 and C2, a transformer T, a parasitic diode D1, NMOS transistors 11 and 12, and a switching regulator control circuit 18. Both end sides of the capacitor C1 are connected to power input terminals 15 and 16 respectively, and both end sides of the capacitor C2 are connected to output terminals 19 and 20 respectively. The power input terminal 15 is connected to a positive terminal of an on-vehicle battery 13 and the power input terminal 16 is connected to a negative terminal of the on-vehicle battery 13. The output terminal 19 is connected to an anode side of each of the LEDs 40-1 to 40-N. The output terminal 20 is connected to a cathode side of each of the LEDs 40-1 to 40-N.

In the switching regulator 10, ON/OFF operations of the NMOS transistor 1 are carried out in response to a switching signal output from the switching regulator control circuit 18, for example, a switching signal having a frequency of several tens to several hundreds kHz, for example. A DC voltage input between the power input terminals 15 and 16 is converted into an AC voltage in order to change the DC voltage into light emitting energy of each of the LEDs 40-1 to 40-N. The AC voltage is rectified on a secondary side of the transformer T.

The diode is known as a unit for rectifying a current and the capacitor is known as a unit for smoothing the rectified current. In the first embodiment, an output current of the switching regulator is large. For the rectifying unit therefore, an MOS transistor is more preferable than the diode in that the unit has a smaller loss. Consequently, the NMOS transistor 12 is used as a rectifying unit to carry out a synchronous rectifying control. The NMOS transistor has a lower ON resistance than a PMOS (Positive Channel Metal Oxide Semiconductor) transistor. Therefore, it is also possible to reduce a current loss and a circuit scale by carrying out a driving operation on a GND (ground) basis.

The DC voltage thus input is converted into an AC voltage at a primary side of the transformer T. The AC voltage is rectified by using, as rectifying units, the NMOS transistor 12 and the parasitic diode D1, which are provided on the secondary side, and the rectified current is smoothed by the capacitor C2. The DC current thus smoothed is supplied to each of the LEDs 40-1 to 40-N.

The current driving portions 30-1 to 30-N have a comparison amplifier 31, and an NMOS transistor 32 and a PMOS transistor 33, which function as switching portions respectively, and supply the LED driving current to the LEDs 40-1 to 40-N. An NPN bipolar transistor may be provided in place of the NMOS transistor 32.

A shunt resistor RSH functioning as a current detecting portion is connected to the cathode sides of the LEDs 40-1 to 40-N. One of ends of the shunt resistor RSH is connected to a negative input terminal of the comparison amplifier 31. A positive input terminal of the comparison amplifier 31 is connected to the power output terminal 20 through a resistor R8. A gate of the NMOS transistor 32 and a Zener diode ZD1 serving as a first voltage drop detecting portion constituting the control portion 50, which will be described below, are connected to a comparing output terminal of the comparison amplifier 31. The NMOS transistor 32 is connected to the PMOS transistor 33 through a resistor R2.

The PMOS transistor 33 and a Zener diode ZD2 serving as a second voltage drop detecting portion constituting the control portion 50, which will be described below, are connected to the anode sides of the LEDs 40-1 to 40-N.

The control portion 50 has a control circuit 25 and an abnormal state detecting portion provided separately for the current driving portions 30-1 to 30-N.

The abnormal state detecting portion includes the Zener diode ZD1 and an NPN transistor 34, and the Zener diode ZD2 and an NPN transistor 35. Collectors of the NPN transistors 34 and 35 are connected to the control circuit 25.

An operation of the lighting controller according to the first embodiment will be described below.

In a normal state, a current does not flow to the Zener diode ZD1 but flows to the Zener diode ZD2. For this reason, the NPN transistor 34 is brought into an OFF operation state so that a signal having a high level is output to the control circuit 25 through a pull-up resistor R19.

For example, in the case in which only the LED 40-1 is opened and the other LEDs 40-2 to 40-N are normal as a first abnormal state, the current does not flow to the cathode side of the LED 40-1. Therefore, the current is not detected by the shunt resistor RSH.

A driving current detected by the shunt resistor RSH is applied as a detected voltage to the negative input terminal of the comparison amplifier 31. A predetermined reference voltage (a threshold) is applied to the positive input terminal of the comparison amplifier 31. The comparison amplifier 31 compares the detected voltage with the reference voltage and sends a comparing output corresponding to a fluctuation in the detected voltage with respect to the reference voltage.

Accordingly, the comparing output of the comparison amplifier 31 is increased so that the current flows to the Zener diode ZD1 and the NPN transistor 34 is brought into the ON operation state to output a signal having a low level to the control circuit 25. The control circuit 25 transmits an alarm signal (a signal for giving a notice that the LED 40-1 is opened) to a communicating signal input terminal 45 upon receipt of the signal having the low level.

For example, in the case in which the anode and the cathode in the LED 40-1 are short-circuited as a second abnormal state, a voltage on the anode side is dropped. For this reason, the current does not flow to the Zener diode ZD2 so that the NPN transistor 35 is turned OFF and a signal having a high level is output to the control circuit 25 through the pull-up resistor R19. The control circuit 25 transmits an alarm signal (a signal for giving a notice that the anode and the cathode in the LED 40-1 are short-circuited) to the communicating signal input terminal 45 upon receipt of the signal having the high level.

For example, in the case in which the anode side of the LED 40-1 is grounded as a third abnormal state, the voltage on the anode side is dropped in the same manner as the second abnormal state. However, a grounding current does not flow to the cathode side of the LED 40-1.

Because the voltage on the anode side is dropped, the current flows to the Zener diode ZD2 so that the NPN transistor 35 is turned ON to transmit an ON signal to the control circuit 25. Because the grounding current does not flow to the cathode side of the LED 40-1, the current is not detected by the shunt resistor RSH. Accordingly, the comparing output of the comparison amplifier 31 is increased so that the current flows to the Zener diode ZD1 and the NPN transistor 34 is turned ON to transmit the ON signal to the control circuit 25.

More specifically, the third abnormal state is detected by both of the Zener diodes ZD1 and ZD2.

The ON signal is transmitted to the switching regulator control circuit 18 through the control circuit 25. The switching regulator control circuit 18 transmits an OFF signal to the NMOS transistor 11 to cause the NMOS transistor 11 to be turned OFF. The OFF signal indicates a signal having a high ratio of OFF duty. More specifically, the OFF signal is input to the gate of the NMOS transistor 11 to stop an output of the switching regulator 10. The output of the switching regulator 10 is stopped so that driving operations of all of the LEDs 40-1 to 40-N are stopped.

For example, in the case in which the cathode side of the LED 40-1 is grounded as a fourth abnormal state, finally, the voltage on the cathode side is changed and the shunt resistor RSH detects the slight change. Consequently, the comparing output of the comparison amplifier 31 is increased and the current flows to the Zener diode ZD1 so that the NPN transistor 34 is turned ON to transmit the ON signal to the control circuit 25. The control circuit 25 transmits an alarm signal (a signal for giving a notice that the cathode side of the LED 40-1 is grounded) to the communicating signal input terminal 45 upon receipt of the ON signal.

As described above, according to the first embodiment, it is possible to decide whether the manner of the output abnormalities of the LEDs 40-1 to 40-N is an abnormality caused by opening, an abnormality caused by grounding on the cathode side, an abnormality caused by a short circuit between the anode and the cathode, or grounding on the anode side.

Furthermore, it is possible to specify any of the LEDs 40-1 to 40-N that is brought into the abnormal state.

In the first, second and fourth abnormal states, for example, the PNP transistor having the collector connected to the positive input terminal of the comparison amplifier 31 may be provided as in a second embodiment, which will be described below, and a signal may be sent from the control circuit 25 to the gate of the PNP transistor through a signal conductor (which is not shown in FIG. 1) to bring the PMOS transistor 33 into the OFF operation state. In this case, it is possible to stop the supply of a power in only the LED causing the abnormality and to continuously supply the power to the other LEDs. Therefore, it is possible to prevent all of the LEDs from being turned OFF.

Figure 2:
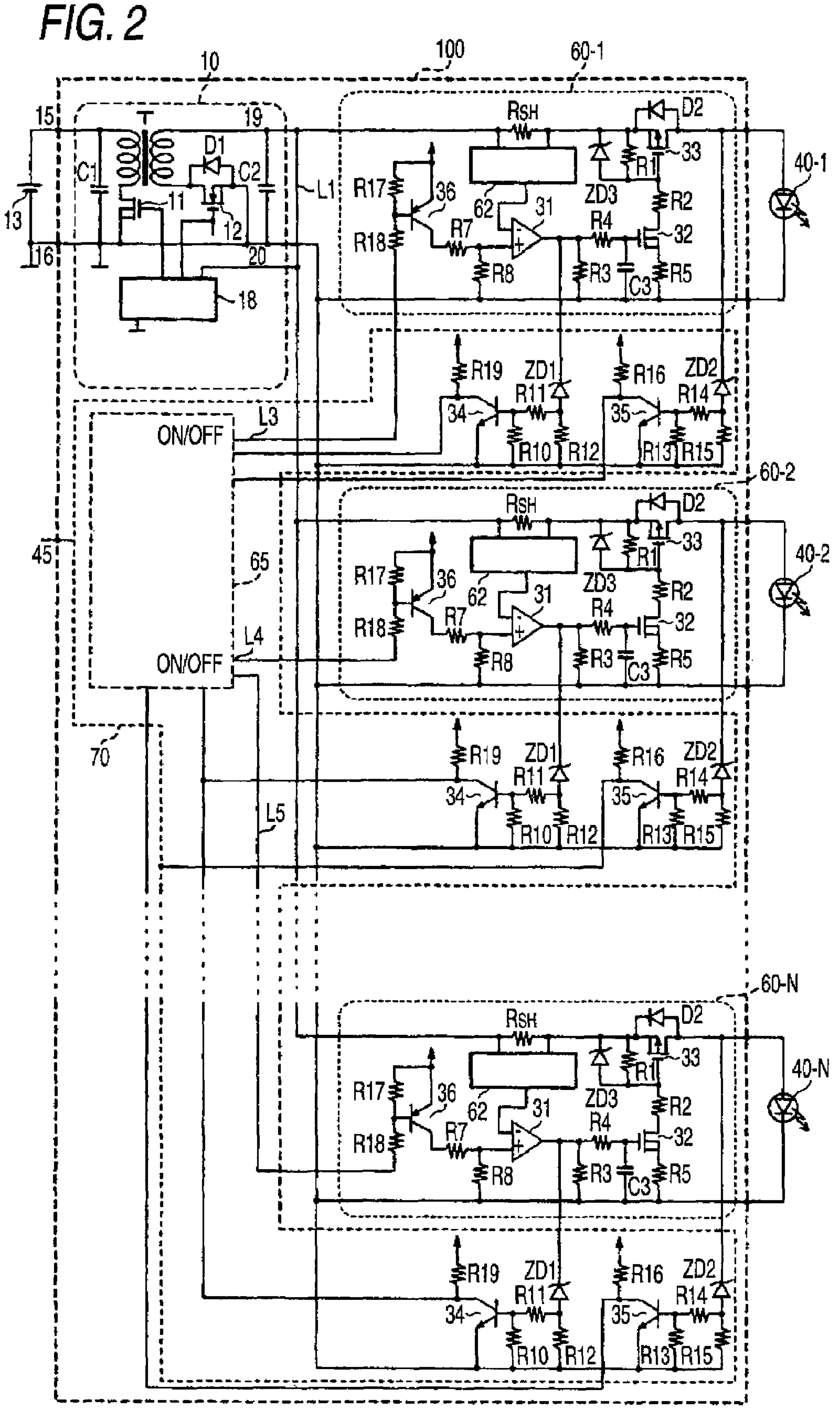
FIG. 2 is a diagram showing a structure of a lighting controller of a lighting device for a vehicle according to a second embodiment of the invention.

Next description will be given to a lighting controller of a lighting device for a vehicle according to the second embodiment of the invention. FIG. 2 is a diagram showing a structure of the lighting controller of a lighting device for a vehicle according to the second embodiment of the invention.

The second embodiment is different from the first embodiment in that a current detecting portion including a shunt resistor is disposed on an anode side of each LED, a current driving portion serves as an output destination of a control signal sent from a control portion, and the control signal sent from the control portion is input to a positive input terminal of a comparison amplifier 31 through a switching transistor. In the following description of the second embodiment, accordingly, the same portions as those in the first embodiment will be described briefly.

A lighting controller 100 of a lighting device for a vehicle includes a single switching regulator 10, LEDs 40-1 to 40-N, current driving portions 60-1 to 60-N, and a control portion 70.

The current driving portions 60-1 to 60-N have the comparison amplifier 31, an NMOS transistor 32, and a PMOS transistor 33 respectively, and supply LED driving currents to the LEDs 40-1 to 40-N.

A shunt resistor RSH is connected to the anode sides of the LEDs 40-1 to 40-N. A differential amplifier 62 is connected in parallel with the shunt resistor RSH. The reason is as follows. Since the anode side of each of the LEDs 40-1 to 40-N is not grounded, it is necessary to set a predetermined reference voltage in order to detect a drop voltage on both ends of the shunt resistor RSH.

A voltage detected by the shunt resistor RSH is connected to a negative input terminal of the comparison amplifier 31 through the differential amplifier 62. A positive input terminal of the comparison amplifier 31 is connected to a collector of a PNP transistor 36 through a resistor R7. A base of the PNP transistor 36 is connected to an ON/OFF signal output terminal of a control circuit 65 through a resistor R18.

A control portion 70 has an abnormal state detecting portion separately for the current driving portions 60-1 to 60-N. The abnormal state detecting portion has the same structure as that of the first embodiment.

An operation of the lighting controller according to the second embodiment will be described below.

For example, in the case in which only the LED 40-1 is opened and the other LEDs 40-2 to 40-N are normal as a first abnormal state, a current does not flow to the cathode side of the LED 40-1. Accordingly, a comparing output of the comparison amplifier 31 is increased so that the current flows to a Zener diode ZD1 and an NPN transistor 34 is turned ON to transmit an ON signal to the control circuit 65. The control circuit 65 transmits an alarm signal (a signal for giving a notice that the LED 40-1 is set into an opening state) to a communicating signal input terminal 45 upon receipt of the ON signal.

For example, in the case in which the anode and the cathode in the LED 40-1 are short-circuited as a second abnormal state, a voltage on the anode side is dropped. For this reason, the current flows to a Zener diode ZD2 so that an NPN transistor 35 is turned ON to transmit an ON signal to the control circuit 65. The control circuit 65 transmits an alarm signal (a signal for giving a notice that the anode and the cathode in the LED 40-1 are short-circuited) to the communicating signal input terminal 45 upon receipt of the ON signal.

For example, description will be given to the case in which the anode side of the LED 40-1 is grounded as a third abnormal state.

In the first embodiment, in the case in which the anode side of the LED 40-1 is grounded, the ON signal output from the control circuit 25 is transmitted to the switching regulator control circuit 18, and the switching regulator control circuit 18 controls the NMOS transistor 11 in order to stop the output of the switching regulator 10.

The second embodiment is different from the first embodiment in that the control portion 70 carries out a control to stop a driving operation of only the LED 40-1 in the case in which the anode side of the LED 40-1 is grounded.

In the case in which the anode side of the LED 40-1 is grounded, a voltage on the anode side is dropped. Therefore, a current flows to the Zener diode ZD2 so that the NPN transistor 35 is turned ON to transmit an ON signal to the control circuit 65. Although the current is also detected by the shunt resistor RSH at the anode side of the LED 40-1, the control circuit 65 controls the comparison amplifier 31 in order to reduce the comparing output. For this reason, the current does not flow to the Zener diode ZD1 so that the detection is not carried out by the Zener diode ZD1. Accordingly, the third abnormal state is detected by only the Zener diode ZD2.

The control circuit 65 transmits a signal having a high level upon receipt of the ON signal. The signal having the high level is input from the control circuit 65 to the base of the PNP transistor 36 through a signal conductor L3. The PNP transistor 36 is turned OFF upon receipt of the signal having the high level. Therefore, a voltage is not applied to the positive input terminal of the comparison amplifier 31. On the other hand, a certain voltage is applied from the differential amplifier 62 to the negative input terminal of the comparison amplifier 31. Accordingly, a control signal for carrying out a control to turn OFF the NMOS transistor (a signal having a low ratio of ON duty) is transmitted from the comparison amplifier 31 to a gate of the NMOS transistor 32. The NMOS transistor 32 is brought into an OFF operation state upon receipt of the control signal so that the PMOS transistor 33 is also brought into the OFF operation state. Accordingly, the supply of the driving current to the LED 40-1 is stopped. On the other hand, the other LEDs 40-2 to 40-N that are being normally operated are continuously driven exactly.

According to the second embodiment, therefore, it is possible to stop the driving operation of only the LED from which an abnormality is detected.

For example in the case in which the cathode side of the LED 40-1 is grounded as a fourth abnormal state, finally, a change in the voltage on the cathode side of the LED 40-1 is not generated. The reason is that the cathode side of the LED 40-1 is grounded and a node on the cathode side of the LED 40-1 has a GND potential. The current continuously flows to the anode side so that the change in the voltage is not generated. With the structure in which the shunt resistor RSH is provided on the anode sides of the LEDs 40-1 to 40-N, accordingly, the cathode grounding state can be cancelled. For this reason, it is not necessary to carry out a control through the cathode grounding.

As described above, according to the second embodiment, it is possible to decide whether the manner of the output abnormality of the LEDs 40-1 to 40-N is an abnormality caused by opening, an abnormality caused by a short circuit between the anode and the cathode, or an abnormality caused by grounding on the anode side or the cathode side.

Furthermore, it is possible to specify any of the LEDs 40-1 to 40-N in which the abnormal state is brought, and to stop the driving operation of the specified LED. More specifically, in the abnormal state, it is possible to transmit a signal from the control circuit 65 to a gate of the PNP transistor 36 through the signal conductor L3, to bring the PMOS transistor 33 into an OFF operation state and to stop the supply of the power to only the LED causing the abnormality, thereby supplying the power to the other LEDs continuously. Therefore, it is possible to stop the driving operation of the specified LED, thereby preventing all of the LEDs from being turned OFF.

While description has been made in connection with exemplary embodiments of the present invention, it will be obvious to those skilled in the art that various changes and modification may be made therein without departing from the present invention. It is aimed, therefore, to cover in the appended claims all such changes and modifications falling within the true spirit and scope of the present invention.

DESCRIPTION OF THE REFERENCE NUMERALS

1, 100 . . . lighting controller, 10 . . . switching regulator, 11, 12, 32 . . . NMOS transistor, 13 . . . on-vehicle battery, 15, 16 . . . power input terminal, 18 . . . switching regulator control circuit, 19, 20 . . . output terminal 25, 65 . . . control circuit 30-1 to 30-N, 60-1 to 60-N . . . current driving portion, 31 . . . comparison amplifier, 33 . . . PMOS transistor, 34, 35 . . . NPN transistor, 36 . . . PNP transistor, 40-1 to 40-N . . . LED, 45 . . . communicating signal input terminal, 50, 70 . . . control portion, 62 . . . differential amplifier.

What is claimed is:

1. A lighting controller of a lighting device for a vehicle comprising:
- a switching regulator for supplying a driving current to first to Nth (where N is an integer of one or more) semiconductor light sources;
- first to Nth current driving means comprising:
  - first to Nth current detecting portions connected in series to the semiconductor light sources and serving to detect the driving current respectively,
  - first to Nth switching portions connected to positive electrode sides of the semiconductor light sources respectively, and
  - first to Nth comparing portions for transmitting a comparing output corresponding to a result of a comparison, which is obtained by comparing values of the driving currents detected by the current detecting portions with a predetermined threshold respectively,
- wherein the first to Nth current driving means serve to carry out operations of the switching portions corresponding to the comparing output respectively; and
- control means comprising:
  - first to Nth first voltage drop detecting portions for detecting voltages on output sides of the comparing portions and transmitting first to Nth first detection results, and
  - first to Nth second voltage drop detecting portions for detecting voltages on positive electrode sides of the semiconductor light sources and transmitting first to Nth second detection results respectively,
- wherein the control means controls the first to Nth current driving means corresponding to the first to Nth first detection results and the first to Nth second detection results respectively.

2. The lighting controller of a lighting device for a vehicle according to claim 1, wherein the first to Nth current detecting portions are connected in series to negative electrode sides of the first to Nth semiconductor light sources respectively.

3. The lighting controller of a lighting device for a vehicle according to claim 1, wherein the driving currents detected by the first to Nth current detecting portions are input to inverted inputs of the first to Nth comparing portions respectively, and
- the control means controls the comparing output of the comparing portion in such a manner that a corresponding one of the switching portions is turned OFF upon receipt of the first detection result and the second detection result when an output abnormality is caused in the semiconductor light sources.

4. The lighting controller of a lighting device for a vehicle according to claim 3, wherein the first to Nth current detecting portions are connected in series to the positive electrode sides of the first to Nth semiconductor light sources respectively.

5. A lighting controller of a lighting device for a vehicle comprising:
- a switching regulator for supplying a driving current to first to Nth (N is an integer of one or more) semiconductor light sources;
- first to Nth current driving portions comprising:
  - first to Nth current detecting portions connected in series to the semiconductor light sources and serving to detect the driving current respectively,
  - first to Nth switching portions connected to positive electrode sides of the semiconductor light sources respectively, and
  - first to Nth comparing portions for transmitting a comparing output corresponding to a result of a comparison, which is obtained by comparing values of the driving currents detected by the current detecting portions with a predetermined threshold respectively,
- wherein the first to Nth current driving portions serve to carry out operations of the switching portions corresponding to the comparing output respectively; and
- a control portion comprising:
  - first to Nth first voltage drop detecting portions for detecting voltages on output sides of the comparing portions and transmitting first to Nth first detection results, and
  - first to Nth second voltage drop detecting portions for detecting voltages on positive electrode sides of the semiconductor light sources and transmitting first to Nth second detection results respectively, wherein the control portion controls the first to Nth current driving portions corresponding to the first to Nth first detection results and the first to Nth second detection results respectively.

6. The lighting controller of a lighting device for a vehicle according to claim 5, wherein the first to Nth current detecting portions are connected in series to negative electrode sides of the first to Nth semiconductor light sources respectively.

7. The lighting controller of a lighting device for a vehicle according to claim 5, wherein the driving currents detected by the first to Nth current detecting portions are input to inverted inputs of the first to Nth comparing portions respectively, and the control portion controls the comparing output of the comparing portion in such a manner that a corresponding one of the switching portions is turned OFF upon receipt of the first detection result and the second detection result when an output abnormality is caused in the semiconductor light sources.

8. The lighting controller of a lighting device for a vehicle according to claim 7, wherein the first to Nth current detecting portions are connected in series to the positive electrode sides of the first to Nth semiconductor light sources respectively.

* * * * *